(12) United States Patent
Lee et al.

(10) Patent No.: US 7,499,471 B2
(45) Date of Patent: Mar. 3, 2009

(54) TIME DIVISION MULTIPLEXING FRAME FOR MULTIPLEXING DIFFERENT SYNCHRONOUS SIGNALS AND METHOD FOR TRANSMITTING AND RECEIVING THE SAME

(75) Inventors: Seung-Jin Lee, Seoul (KR); Yun-Je Oh, Yongin-si (KR); Jun-Ho Koh, Suwon-si (KR); Jae-Hun Cho, Suwon-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 908 days.

(21) Appl. No.: 10/941,711

(22) Filed: Sep. 15, 2004

(65) Prior Publication Data
US 2005/0169316 A1 Aug. 4, 2005

(30) Foreign Application Priority Data
Jan. 30, 2004 (KR) .................. 10-2004-0006177

(51) Int. Cl.
*H04J 4/00* (2006.01)
(52) U.S. Cl. .................. 370/478; 370/476; 398/66
(58) Field of Classification Search .................. 370/392, 370/353, 463, 476, 477, 486, 478; 398/66–72
See application file for complete search history.

(56) References Cited

U.S. PATENT DOCUMENTS

| | | | |
|---|---|---|---|
| 6,434,171 B1 * | 8/2002 | Ishida | 370/537 |
| 6,778,550 B1 * | 8/2004 | Blahut | 370/443 |
| 7,127,167 B2 * | 10/2006 | Sala et al. | 398/72 |
| 7,340,171 B2 * | 3/2008 | Song et al. | 398/72 |
| 2002/0012365 A1 | 1/2002 | Mueller | |

FOREIGN PATENT DOCUMENTS

| | | |
|---|---|---|
| EP | 1235433 A2 | 8/2002 |
| WO | WO 98/43423 | 10/1998 |
| WO | WO 99/38292 | 7/1999 |

\* cited by examiner

*Primary Examiner*—Ricky Ngo
*Assistant Examiner*—Dady Chery
(74) *Attorney, Agent, or Firm*—Cha & Reiter, LLC

(57) ABSTRACT

A TDM (Time Division Multiplexing) frame applicable to digital broadcast data transmission in an FTTH (Fiber To The Home) system and a method for transmitting and receiving the TDM frame is disclosed. The TDM frame and methods are applicable to transmit a plurality of digital broadcast data units having different synchronous clocks using a simple format. The TDM frame for multiplexing digital broadcast and communication signals having different synchronous signals in a broadcast/communication convergence system using an FTTH system comprises a framing bit field for identifying a start and end of the TDM frame seamlessly provided; two MPTS (Multiple-Program Transport Stream) fields respectively having at least one bit assigned for digital broadcast data transmission wherein an amount of input digital broadcast data is adjusted according to a difference between a multiplexing rate and an input rate associated with the digital broadcast data in the digital broadcast data transmission; and a fast Ethernet field having at least one bit assigned for communication data transmission.

18 Claims, 3 Drawing Sheets

FIG.3

TIME DIVISION MULTIPLEXING FRAME FOR MULTIPLEXING DIFFERENT SYNCHRONOUS SIGNALS AND METHOD FOR TRANSMITTING AND RECEIVING THE SAME

CLAIM OF PRIORITY

This application claims priority, pursuant to 35 U.S.C. §119, to that patent application entitled "TIME DIVISION MULTIPLEXING FRAME FOR MULTIPLEXING DIFFERENT SYNCHRONOUS SIGNALS AND METHOD FOR TRANSMITTING AND RECEIVING THE SAME," filed in the Korean Intellectual Property Office on Jan. 30, 2004 and assigned Ser. No. 2004-6177, the contents of which are hereby incorporated by reference.

BACKGROUND OF THE INVENTION

1. Field of the Invention

The present invention relates to an FTTH (Fiber To The Home) systems, and more particularly to a TDM (Time Division Multiplexing) frame applicable for digital broadcast data transmission in an FTTH (Fiber To The Home) system and a method for transmitting and receiving the TDM frame.

2. Description of the Related Art

A broadcast services and communication services are currently provided independently to the home or office. Research on convergence of broadcast services and communication services is presently being conducted. Bi-directional HFC (Hybrid Fiber Coaxial) type system, and IP (Internet Protocol)-based system using an xDSL (x Digital Subscriber Line) network are known broadcast/communication systems. A system based on an FTTH (Fiber To The Home) is also be considered.

Because the broadcast/communication convergence system of the bi-directional HFC type uses a coaxial cable, there is a problem in that the bandwidth is limited due to a physical limit of the coaxial cable and a complex modulation scheme, such as a subcarrier modulation scheme, must be used. Moreover, as the IP-based broadcast/communication convergence system using the xDSL network that performs a transmission operation in units of packets, it is difficult for the broadcast service to be seamlessly provided. In this case, since a process for linking the packet units is required, time delay is incurred and a real-time broadcast service cannot be appropriately provided, such that QoS (Quality of Service) cannot be satisfied. In addition, because the xDSL uses a copper line as a transmission medium, there is a drawback in that a bandwidth is limited due to physical properties of the copper line.

For this reason, the broadcast/communication convergence system using the FTTH system is popular because of a wider bandwidth and faster transmission speed.

The broadcast/communication convergence system using the FTTH system uses a TDM transmission technique for convergence of the broadcast service and communication service. Here, the TDM transmission technique is to ensure a plurality of time slots is available and that there is appropriate transmission of desired data at each time slot. If a processing operation associated with the time slots is appropriately performed, broadcast streams can be seamlessly transmitted.

Where a digital broadcast based on the FTTH system is transmitted using the TDM transmission technique, synchronization between transmission data units is an important factor. In particular, transmission clock synchronization for a digital broadcast can be different for each broadcast provider or broadcast program. Where various clock signals are inputted, a need exists for a TDM frame format capable of synchronizing the different clock signals.

SUMMARY OF THE INVENTION

Therefore, one aspect of the present invention is to provide a TDM (Time Division Multiplexing) frame using a stuff bit and a method for transmitting and receiving the TDM frame that can transmit and receive a plurality of digital broadcast data units having different synchronous clocks using a simple format.

In accordance with another aspect of the present invention, a TDM (Time Division Multiplexing) frame for multiplexing digital broadcast and communication signals based on different synchronous signals in a broadcast/communication convergence system using an FTTH (Fiber To The Home) is provided and includes a framing bit field for identifying a start and end of the TDM frame seamlessly provided, two MPTS (Multiple-Program Transport Stream) fields respectively having at least one bit assigned for digital broadcast data transmission wherein an amount of input digital broadcast data is adjusted according to a difference between a multiplexing rate and an input rate associated with the digital broadcast data in the digital broadcast data transmission, and a fast Ethernet field having at least one bit assigned for communication data transmission.

In accordance with another aspect of the present invention, a method for transmitting a TDM (Time Division Multiplexing) frame in which different synchronous signals are multiplexed is provided and includes the steps of dividing data to be inputted to the TDM frame in a predetermined bit unit and inserting the divided data into the TDM frame, comparing an input rate of the data inserted in the predetermined bit unit with a multiplexing rate, and inserting a stuffing control field indicating a corresponding rate difference at every input data of the predetermined bit unit, and adjusting the number of last transmission bits of the TDM frame according to a value of the stuffing control field and carrying out a transmission operation.

In accordance with yet another aspect of the present invention, a method for receiving a TDM (Time Division Multiplexing) frame in which different synchronous signals are multiplexed is provided and includes the steps of comparing an input rate of transmission data inputted to the TDM frame with a multiplexing rate, extracting a stuffing control field indicating a corresponding rate difference, and confirming the number of bits included in the received TDM frame and extracting the transmission data from the received TDM frame according to the confirmed number of bits.

BRIEF DESCRIPTION OF THE DRAWINGS

The above features and other advantages of the present invention will be more clearly understood from the following detailed description taken in conjunction with the accompanying drawings, in which:

FIG. 3 shows MPTS (Multiple-Program Transport Stream) fields for accommodating a plurality of digital broadcast data units based on different synchronous signals in accordance with an embodiment of the present invention.

DETAILED DESCRIPTION OF THE INVENTION

Figure 1:
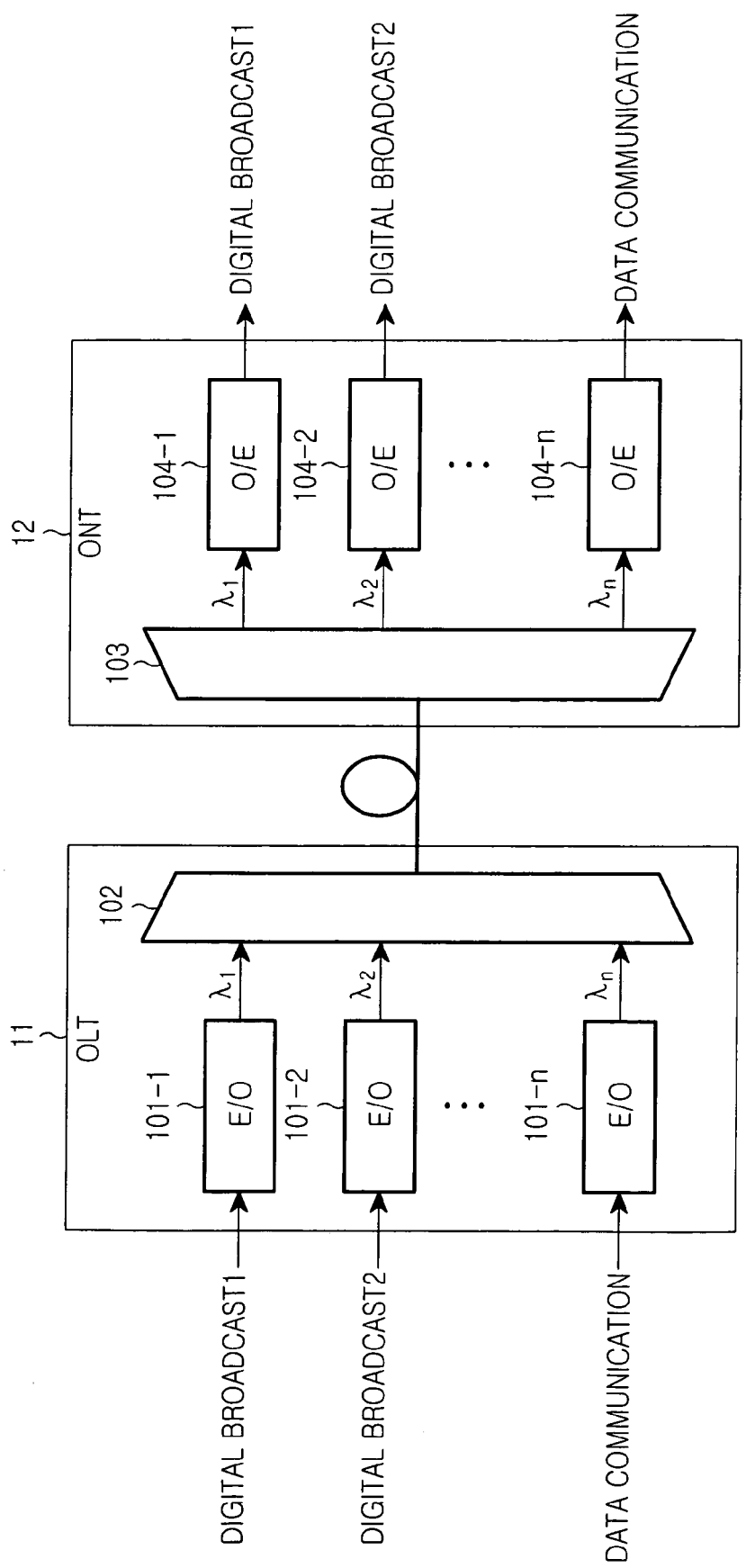
FIG. 1 is a schematic block diagram illustrating a broadcast/communication convergence system based on an FTTH (Fiber To The Home) system to which the present invention is applied.

Now, embodiments of the present invention will be described in detail with reference to the annexed drawings. In the drawings, the same or similar elements are denoted by the same reference numerals even though they are depicted in different drawings. For the purposes of clarity and simplicity, a detailed description of known functions and configurations incorporated herein will be omitted as it may make the subject matter of the present invention unclear.

FIG. 1 is a schematic block diagram illustrating a broadcast/communication convergence system based on an FTTH (Fiber To The Home) system to which the present invention is applied. As shown, the broadcast/communication convergence system based on the FTTH system to which the present invention is applied, includes an OLT (Optical Line Terminal) 11 serving as a subsystem positioned between users and a service node, an ONT (Optical Network Terminal) 12 serving as a device of a user side, and an optical cable connected between the OLT 11 and the ONT 12. The OLT 11 electro-optically converts a plurality of broadcast and communication signals received from broadcast and communication providers into different wavelength signals $\lambda_1, \lambda_2, \ldots \lambda_n$, multiplexes the different wavelength signals into a single optical signal and sends the single optical signal so that broadcast/communication services such as digital broadcast, analog broadcast, voice telephone, video service, high-speed Internet, etc. can be provided to users. The ONT 12 transfers information received from the OLT 11 to the users in the form of time slot signals.

More specifically, the OLT 11 includes a plurality of E/O (Electrical-Optical) converters 101-1 to 101-n each electro-optically converting a broadcast or communication signal; and an optical multiplexer 102 for multiplexing electro-optically converted signals based on a plurality of wavelengths into the single optical signal and transmitting the single optical signal. Moreover, the ONT 12 includes an optical demultiplexer 103 for demultiplexing the transmitted single optical signal into the electro-optically converted signals based on the plurality of wavelengths; and O/E (Optical-Electrical) converters 104-1 to 104-n each converting the electro-optically converted signal into an electrical signal corresponding to the broadcast or communication signal. Hence, the broadcast signal and the communication signal are transferred to the ONT 12 and ONT 12 selects and switches the broadcast signal desired by a user and then delivers a TDM frame to the user.

Figure 2:
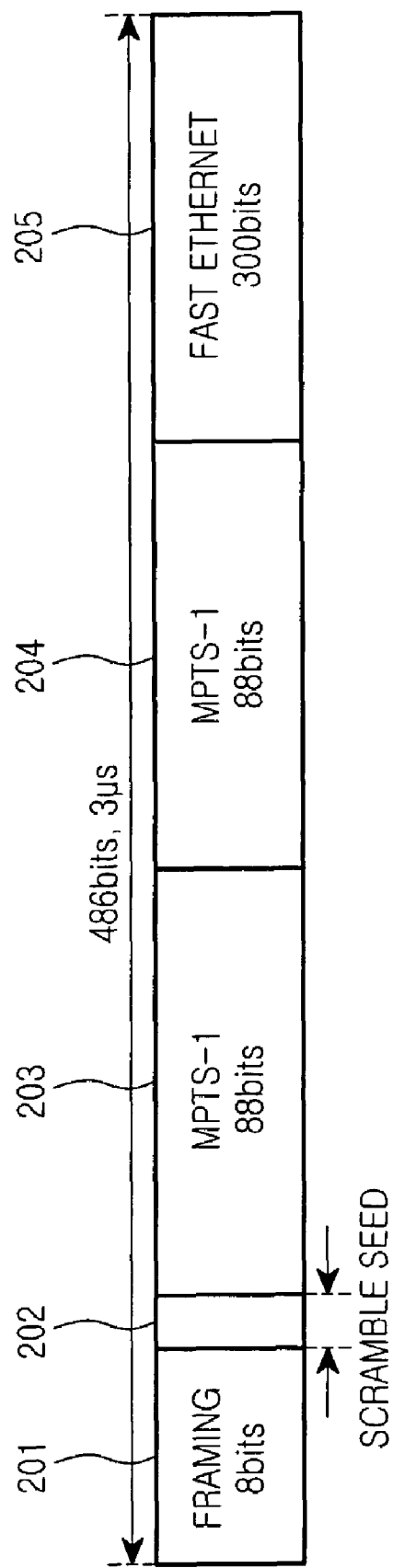
FIG. 2 shows a format of a TDM (Time Division Multiplexing) frame in accordance with an embodiment of the present invention.

FIG. 2 illustrates a format of a TDM (Time Division Multiplexing) frame in accordance with an embodiment of the present invention. In this illustrative embodiment of the present invention the frame format is capable of multiplexing two 27-Mbps MPEG-2 (Motion Picture Expert Group-2) TSs (Transport Streams) and 100-BASE-X fast Ethernet data, as will be more clearly explained.

As shown, the TDM frame in accordance with the present invention operates preferably at 162 MHz, and the TDM frame's length is 486 bits. In detail, the TDM frame includes an 8-bit framing bit field 201 necessary for identifying a start and end of the frame; a 2-bit scramble seed field 202 indicating scramble information associated with four types of polynomial expressions for scrambling; an 88-bit MPTS-1 (Multiple-Program Transport Stream-1) field 203 and an 88-bit MPTS-2 field 204 for transporting broadcast streams; and a 300-bit fast Ethernet field 205 for transporting communication data. In another aspect, the scramble seed field 202 can be replaced with other information in the TDM frame.

In a one specific embodiment, 8-bit framing bit field 201 is set to a value "10101010" ($AA_{16}$) and allows a demultiplexing stage to easily identify the start and end of the frame, and further allows an optical detection stage to easily perform a CDR (Clock and Data Recovery) operation. Of course, the set value "10101010" is only an example in the embodiment of the present invention. In the present invention, those skilled in the art can understand that a value of the framing bit field 201 is not limited to the value "10101010".

Because the digital broadcast stream and fast Ethernet, i.e., communication, data include a plurality of consecutive 1's or 0's, respectively, a scrambling operation must be performed when an optical transmission operation is carried out. In accordance with the embodiment of the present invention, the 2-bit scramble seed field 202 is used for a stable scrambling operation and the four types of polynomial expressions are sequentially used, such that a stream of the consecutive 1's or 0's can be avoided. Scrambling is well-known in the communications art and need not be described in detail herein.

In order to include the two 27-Mbps MPEG-2 TSs and the 100-BASE-X fast Ethernet data, the TDM frame includes the two 88-bit MPTS fields 203 and 204 and the 300-bit fast Ethernet field 205. Here, in order to accommodate digital broadcast data units based on different synchronous signals, the MPTS fields include six stuffing control bits and one stuff bit in accordance with the present invention, respectively. The 88-bit MPTS fields are shown in FIG. 3.

Figure 3:
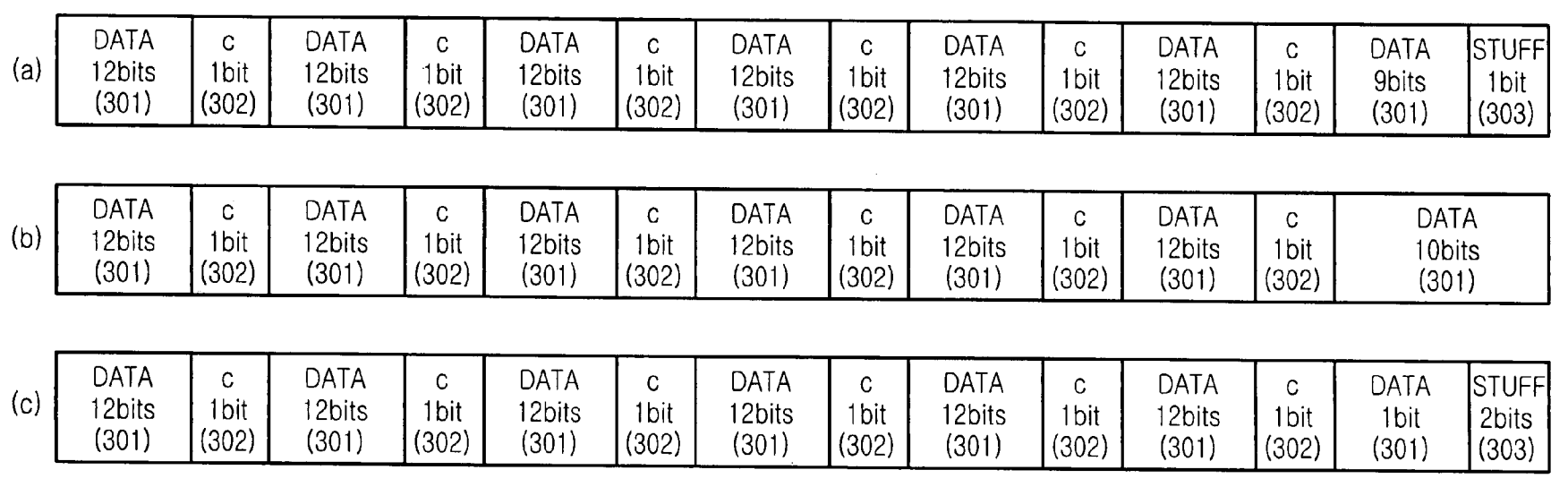

FIG. 3 shows MPTS fields for accommodating digital broadcast data units based on different synchronous signals in accordance with an embodiment of the present invention. As shown, the MPTS field in accordance with the present invention includes a basic format consisting of six 12-bit data fields 301 for digital broadcast streams based on different synchronous signals and six stuffing control fields 302 necessary for a stuffing control operation according to a result of a determination as to synchronization in the data fields 301, and a 1-bit stuff field 303 for compensating for broadcast data not synchronized with a 9-bit data field.

In accordance with the present invention, stuffing modes include three modes such as a normal mode, a positive mode and a negative mode.

With regard to the normal mode, this mode corresponds to the case wherein a broadcast signal input rate and a multiplexing rate are the same. In this normal mode, a transmission operation is carried out for a frame in which the last 9-bit data field is filled with data and the 1-bit stuff field 303 is empty. In FIG. 3, the frame referred to as (a) indicates a frame format in case of the normal mode.

With regard to the positive mode, this mode corresponds to the case wherein the broadcast signal input rate is higher than the multiplexing rate. In this positive mode, a transmission operation is carried out for a frame including the last 10-bit data field in which the 1-bit stuff field is filled with data. In FIG. 3, the frame referred to as (b) indicates a frame format in the case of the positive mode.

With regard to the negative mode, this mode corresponds to the case where the broadcast signal input rate is lower than the multiplexing rate. In this negative mode, a transmission operation is carried out for a frame including the 8-bit data field and the 2-bit stuff field 303 in which a 1-bit data field and a 1-bit stuff field are empty. In FIG. 3, the frame referred to as (c) indicates a frame format in the case of the negative mode.

As described above, the three modes are determined by the stuffing control fields 302. Each of the stuffing control fields 302 used in the present invention is interleaved and inserted into the MPTS field every 12-bit data field. Exemplary values of the stuffing control fields 302 for discriminating the three modes are shown in the following Table 1.

TABLE 1

| Mode | Mode detection condition | Pattern |
|---|---|---|
| Positive | Number of 1's is equal to or larger than 5 | 111111 |
| Normal | Number of 1's is 2, 3 or 4 | 101010 |
| Negative | Number of 1's is 0 or 1 | 000000 |

Because a reception stage carrying out a demultiplexing operation detects a transmission mode using the number of 1's and the number of 0's in the six 1-bit stuffing control fields 302 as shown in the above Table 1, the error rate can be reduced.

In order to constitute a TDM (Time Division Multiplexing) frame so that digital broadcast signals including the stuff bit based on different synchronous clocks can be accommodated, data is inserted in a unit of 12 bits and a plurality of input digital broadcast signals are multiplexed. In this case, a multiplexing time and a broadcasting time are compared with each other. If the broadcasting time is earlier than the multiplexing time, a value of the stuffing control field 302 is set to "1". All values of the stuffing control fields 302 are confirmed from the MPTS field 203 or 204. If the mode detection condition corresponds to the positive mode, for example, if the number of 1's is equal to or larger than 5, a transmission operation is carried out for a frame including the last 10-bit field consisting of the 10-bit data field. Further, if the mode detection condition corresponds to the normal mode, for example, if the number of 1's is 2, 3 or 4, a transmission operation is carried out for a frame including the last 10-bit field consisting of the 9-bit data field and the 1-bit stuff field 303. Furthermore, the mode detection condition corresponds to the negative mode, for example, if the number of 1's is 1 or 0, a transmission operation is carried out for a frame including the last 10-bit field consisting of the 8-bit data field and the 2-bit stuff field 303.

Therefore, the reception stage confirms the stuffing control fields 302 from the transmitted MPTS fields 203 and 204, and a transmission mode is confirmed. The last 10-bit field included in the MPTS field 203 or 204 is determined according to a corresponding mode, and a result of the determination is processed by the reception stage.

As apparent from the above description, the present invention can carry out a multiplexing operation for different digital broadcast signals based on different synchronous clocks using a simple format-based frame in a broadcast/communication convergence system for combining a plurality of digital broadcast signals and transmitting a result of the combining.

Although the embodiments of the present invention have been disclosed for illustrative purposes, those skilled in the art will appreciate that various modifications, additions and substitutions are possible, without departing from the scope of the invention. Therefore, the present invention is not limited to the above-described embodiments, but the present invention is defined by the claims which follow, along with their full scope of equivalents.

In accordance with the embodiment of the present invention, there have been described a TDM (Time Division Multiplexing) frame including an 8-bit framing field, a 2-bit scramble seed field, two 88-bit MPTS (Multiple-Program Transport Stream) fields and a 300-bit fast Ethernet field, each 88-bit MPTS field including six 12-bit data fields, a 9-bit data field, six 1-bit stuffing control fields and a 1-bit stuff field. This description is only an example, and the present invention is not limited thereto.

That is, those skilled in the art can understand that bits of the TDM frame can be differently assigned according to an MPTS bandwidth and a fast Ethernet bandwidth.

What is claimed is:

1. A TDM (Time Division Multiplexing) system multiplexing digital broadcast and communication signals based on different synchronous signals in a broadcast/communication convergence system using an FTTH (Fiber To The Home) system, said system including a transmission frame comprising:

a framing bit field for identifying a start and end of the TDM frame seamlessly provided;

two MPTS (Multiple-Program Transport Stream) fields respectively having at least one bit assigned for digital broadcast data transmission wherein an amount of input digital broadcast data is adjusted according to a difference between a multiplexing rate and an input rate associated wit the digital broadcast data in the digital broadcast data transmission, each of the MPTS fields comprises:

at least one data field into which the digital broadcast data is inserted in a predetermined bit unit, the data field having the predetermined bit unit;

at least one stuffing control field respectively having one bit inserted in the at least one data field and being used to compare the multiplexing rate with the input rate;

a 1-bit stuff field determined by the presence of data insertion according to a value of the at least one stuffing control field; and a remaining data field into which digital broadcast data is inserted, the remaining data field having remaining bits from which the at least one data field, the at least one stuffing field and the stuff field are subtracted among the total number of bits assigned to the MPTS field; and a fast Ethernet field having at least one bit assigned for communication data transmission.

2. The system according to claim 1, wherein the at least one stuffing control. field has an activated stuffing control value, if the input rate is higher than the multiplexing rate when the multiplexing rate and the input rate associated with the digital broadcast data are compared with each other.

3. The system according to claim 2, wherein the remaining data field and the stuff field include digital broadcast data if the number of activated stuffing control fields among the at least one stuffing control field is equal to or larger than a first number, such that a transmission operation is carried out for the digital broadcast data.

4. The system according to claim 2, wherein the remaining data field includes digital broadcast data and the stuff field is empty, if the number of activated stuffing control fields among the at least one stuffing control field is smaller than a first number and larger than a second number, such that a transmission operation is carried out for the digital broadcast data.

5. The system to claim 2, wherein remaining bits from which one bit is subtracted from the remaining data field include digital broadcast data and a field of the one bit and the stuff fleid are empty, if the number of activated stuffing control fields among the at least one stuffing control field is equal or to smaller than a second number, such that a transmission operation is carried out for the digital broadcast data.

6. The system according to claim 2 wherein the stuffing control field is interleaved and inserted at every predetermined bit unit in the MPTS field.

7. A method for transmitting a TDM (Time Division Multiplexing) frame in which different synchronous signals are multiplexed, comprising the steps of:

(a) dividing data to be inputted to the TDM frame in a predetermined bit unit and inserting the divided data into the TDM frame, wherein the TDM frame comprises:
  a framing bit field for identifying a start and end of the TDM frame seamlessly provided;
  two MPTS (Multiple-Program Transport Stream) fields respectively having at least one bit assigned for digital broadcast data transmission wherein an amount of input digital broadcast data is adjusted according to a difference between the multiplexing rate and the input rate associated with the digital broadcast data in the digital broadcast data transmission; and
  a fast Ethernet field having at least one bit assigned for communication data transmission, each of the MPTS fields comprises:
    at least one detailed into which the digital broadcast data is inserted in the predetermined bit unit, the data field having the predetermined bit unit;
    at least one stuffing control field respectively having one bit inserted in the at least one data field and being used to compare the multiplexing rate with the input rate;
    a 1-bit stuff field determined by the presence of data insertion according to a value of the at least one stuffing control field; and
    a remaining data field into which digital broadcast data is inserted, the remaining data field having remaining bits from which the at least one data field, the at least one stuffing field and the stuff field are subtracted among the total number of bits assigned to the MPTS field;
(b) comparing an input rate of the divided data inserted in the predetermined bit unit with a multiplexing rate, and inserting a stuffing control field indicating a corresponding rate difference at every input data of the predetermined bit unit; and
(c) adjusting the number of last transmission bits of the TDM frame according to a value of the stuffing control field and carrying out a transmission operation.

8. The method according to claim 7, wherein the at least one stuffing control field has an activated stuffing control value if the input rate is higher than the multiplexing rate when the multiplexing rate and the input rate associated with the digital broadcast data are compared with each other.

9. The method according to claim 7, wherein the stuffing control field is interleaved and inserted at every predetermined bit unit in the MPTS field.

10. The method according to claim 8, wherein the remaining data field and the stuff field include digital broadcast data if the number of activated stuffing control fields among the at least one stuffing control field is equal to or larger than a first number, such that a transmission operation is carried out for the digital broadcast data.

11. The method according to claim 8, wherein the remaining data field includes digital broadcast data and the stuff field is empty, if the number of activated stuffing control fields among the at least one stuffing control field is smaller than a first number and larger than a second number. such that a transmission operation is carried out for the digital broadcast data.

12. The method according to claim 8, wherein remaining bits from which one bit is subtracted from the remaining data field include digital broadcast data and a field of the one bit and the stuff field are empty, if the number of activated stuffing control fields among the at least one stuffing control field is equal or to smaller than a second number, such that a transmission operation is carried out for the digital broadcast data.

13. A method for receiving a TDM (Time Division Multiplexing) frame in which different synchronous signals are multiplexed, comprising the steps of:

(a) comparing an input rate of transmission data inputted to the TDM frame with a multiplexing rate, extracting a stuffing control field indicating a corresponding rate difference, and confirming the number of bits included in the received TDM frame, wherein the TDM frame comprises:
  a framing bit field for identifying a start and end of the TDM frame seamlessly provided;
  two MPTS (Multiple-Program Transport Stream) fields respectively having at least one bit assigned for digital broadcast data transmission wherein an amount of input digital broadcast data is adjusted according to a difference between the multiplexing rate and the input rate associated with the digital broadcast data in the digital broadcast data transmission; and
  a fast Ethernet field having at least one bit assigned for communication data transmission, each of the MPTS fields comprises:
    at least one data field into which the digital broadcast data is inserted in a predetermined bit unit, the data field having the predetermined bit unit;
    at least one sniffing control field respectively having one bit inserted at the at least one data field and being used to compare the multiplexing rate with the input rate;
    a 1-bit stuff field determined by the presence of data insertion according to a value of the at least one stuffing control field; and
    a remaining data field into which digital broadcast data is inserted the remaining data field having remaining bits from which the at least one data field, the at least one stuffing field and the stuff field are subtracted among the total number of bits assigned to the MPTS field; and
(b) extracting the transmission data from the received TDM frame according to the confirmed number of bits.

14. The method according to claim 13, wherein the at least one stuffing control field has an activated stuffing control value if the input rate is higher than the multiplexing rate when the multiplexing rate and the input rate associated with the digital broadcast data are compared with each other.

15. The method according to claims 13 wherein the stuffing control field is interleaved and inserted at every predetermined bit unit in the MPTS field.

16. The method according to claim. 14, wherein the remaining data field and the stuff field include digital broadcast data if the number of activated stuffing control fields among the at least one stuffing control field is equal to or larger than a first number, such that a transmission operation is carried out for the digital broadcast data.

17. The method according to claim 14, wherein the remaining data field includes digital broadcast data and the stuff field is empty, if the number of activated stuffing control fields among the at least one stuffing control field is smaller than a first number and larger than a second number, such that a transmission operation is carried out for the digital broadcast data.

18. The method according to claim 14, wherein remaining bits from which one bit is subtracted from the remaining data field include digital broadcast data and a field of the one bit and the stuff field are empty, if the number of activated stuffing control fields among the at least one stuffing control field is equal or to smaller than a second number, such that a transmission operation is carried out for the digital broadcast data.

* * * * *